United States Patent Office 3,260,189
Patented July 12, 1966

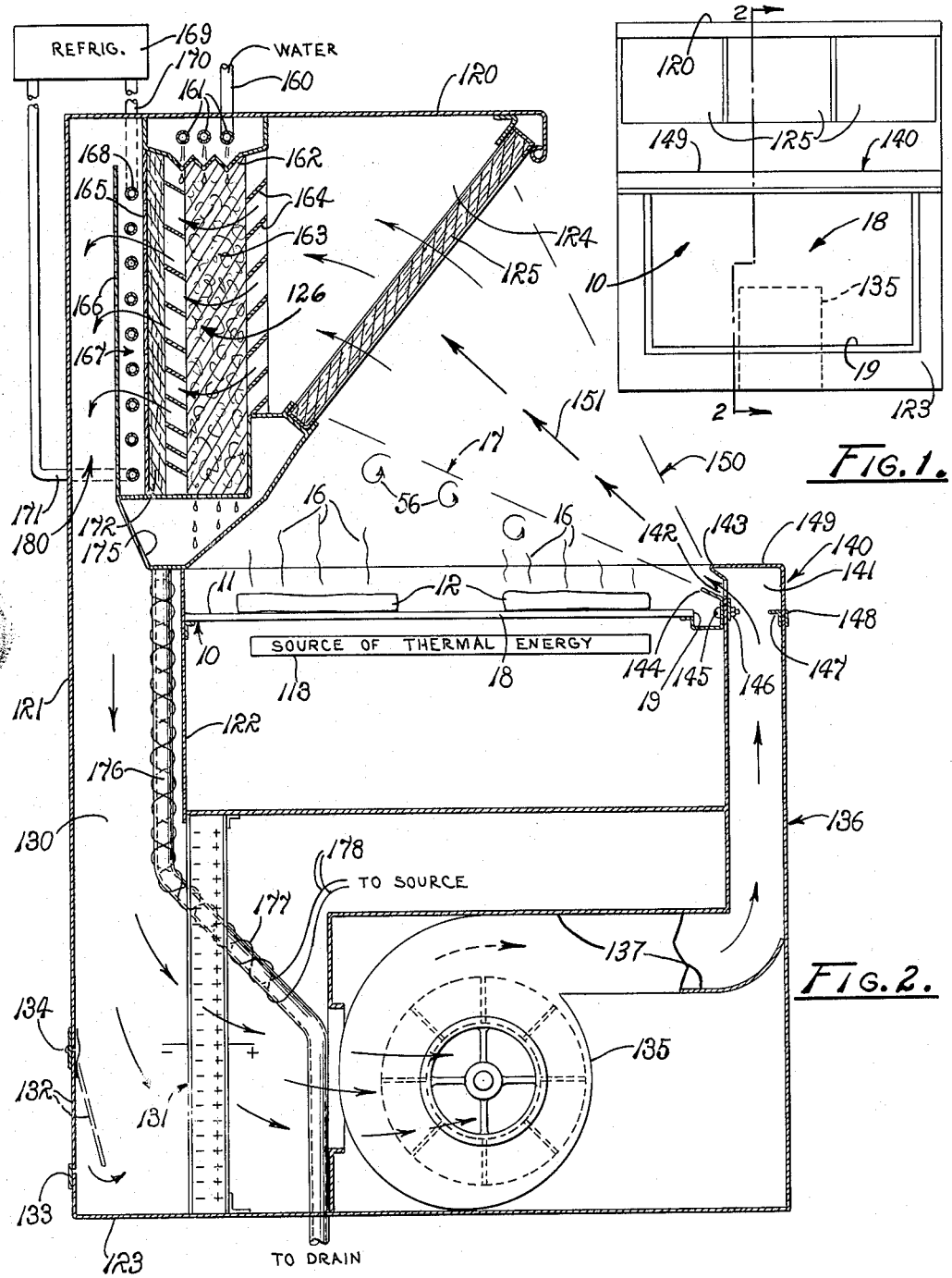

3,260,189
VENTILATION SYSTEM
Donald D. Jensen, 3604 E. Butler, Fresno, Calif.
Filed Oct. 29, 1963, Ser. No. 319,728
1 Claim. (Cl. 98—115)

The present invention relates to a ventilation system adapted to remove objectionable fumes, vapors, smoke and the like emitted from a localized zone, such as cooking ranges, grills or the like. The ventilation system has particular utility in conjunction with a heating unit having a localized heating zone and installed in a closed architectural structure, such as a residence, restaurant, and the like.

It is a conventional practice of ventilating buildings in which localized heating units are located, such ventilating being intended to remove heated air from in and around the heating unit. Ventilation also is employed to remove vapors rising from cooking oils and greases which have been elevated above their vaporization temperature, as well as to remove odors associated with the preparation of food which may be considered objectionable in other parts of a building.

While the present invention has particular utility in conjunction with such heating units used in the preparation of food and is so described herein for the purpose of illustrative convenience, it is to be understood that the invention has utility with other types of devices which have respective localized zones which generate objectionable fumes, such as smoke, vapors, offensive odors or the like. Throughout the specification and the claim, the term fumes will be considered to include any airborne substance, regardless of its physical state which may be either liquid, gaseous, or solid. Minute particles of substances may be suspended in the air either in the liquid or solid phase, such as in the case of air saturated with water vapor, or smoke, which is a dispersed system of solid carbon suspended in the air.

Previously known ventilating systems in buildings, such as restaurants, were designed primarily as exhausting systems and depend upon the air within the building to move towards the ventilating system and serve as a conducting vehicle to carry the fumes to be removed. Most of such exhaust systems employ some form of a canopy or hood supported in a superior position relative to a cooking unit and provide a blower in communication with the hood to create a negative pressure, relative to the remainder of the building, at an exhaust opening defined by the hood.

In ventilating buildings containing large cooking units, it is not uncommon to remove ambient air within the building at rates as high as 5,000 to 10,000 cubic feet per minute. With such high rates of air movement, unpleasant drafts are unavoidably created in the building. Also, the additional heat load to the air conditioning system of such a building represents approximately one-half to two-thirds of the total heat load of the building. By the term "heat load" is meant that quantity of heat which must be either added to or removed from the air within the building to satisfy contemporary levels of human comfort. During the winter, the heating portion of the air conditioning system would be utilized to supply required heat, and conversely, during the summer months, the refrigerating portion of the air conditioning system would remove excess heat rejected to the ambient air by cooking units and occupants of the building.

In such exhaust systems which are employed to remove air laden with fumes containing an appreciable quantity of vaporized grease, the ambient air serving as the vehicle normally is not at a sufficiently low temperature to effect a condensation of the grease in grease filters, normally employed in such exhaust systems. Consequently, the vaporized grease escapes through the filter and subsequently condenses on the walls of the conduits in such exhaust systems. This condensed grease on the conduit walls constitutes a major fire hazard, particularly in restaurant buildings.

In addition to generating undesirable fumes and causing fire hazards by condensation of grease vapors, the heating units employed in restaurants frequently cause painful burns to personnel working in and around such units. The possibility of such burns arises by reason of the high temperature of the cooking unit and the material from which such cooking units are constructed, primarily stainless steel, which is considered a good conductor of heat. The previously known exhaust systems have in no way reduced the possibility of such burns.

Accordingly, it is an object of the present invention to provide a ventilation system which removes grease, smoke, and other fumes emitted from a localized heating zone and materially reduces the fire hazard normally attendant exhaust systems employed for such purpose.

Another object is to provide a ventilation system which materially enhances the safety of personnel working in and around such localized heating zones.

Another object of the invention is to provide a ventilation system for closed buildings which effectively removes objectionable fumes from a localized zone therein while reducing total air and heat losses from within the building from that experienced with previously known exhaust ventilation systems.

Another object of the invention is to provide a ventilation system which effectively removes objectionable fumes emitting from a localized zone.

Another object is to provide a ventilation system which removes fumes from one or more localized zones within a building and requires appreciably less air movement than previously known systems and consequently reduces the power requirements for ventilating purposes.

A further object of the invention is to provide a closed circuit ventilation system having an air exhaust means to remove fumes from a localized zone and an air supply means to admit and direct air toward the zone, both the exhaust and supply means being in communication with a common sump.

These, together with other objects, will become more fully apparent upon reference to the following description and accompanying drawings.

In the drawing:
FIG. 1 is a view in front elevation showing another form of ventilation system embodying the principles of the present invention.
FIG. 2 is an enlarged view in vertical transverse section of the system of FIG. 1 and taken on line 2—2 thereof.

Referring more particularly to the drawing, a localized heating unit in the form of a grill 10 provides an upwardly presented cooking surface 11. For purpose of illustration of the invention, the grill surface 11 supports articles of food thereon, such as steaks, illustrated at 12. Thermal energy is imparted to the steaks by means of a source of thermal energy 113 disposed below the grill in a position to transfer energy thereto by means of radiation, conduction and/or convection. Other forms of elements and/or substances suitable for supplying thermal energy to cook food on the grill 10 will readily occur to those skilled in the art.

It is to be understood that various forms of cooking oils, such as solid fats and the like, as well as fats in the food itself, generate fumes, schematically illustrated at 16, and which may be in the form of grease vapors, water vapors, odors, smoke, and the like. The fumes 16 are generated in a localized zone overlying the grill 10 and indicated at 17. The zone 17 includes a central portion 18 defined by marginal edges, one of which is indicated at 19.

An exhaust hood 120 is supported in a generally superior position relative to the grill 10 and the zone 17 normally containing the fumes 16. The hood is supported by an external conduit wall 121 in conjunction with an internal wall 122, both of which are mounted on a base 123. The hood 120 defines an exhaust opening 124 in which is fitted a suitable filter 125 adapted to remove vaporized grease passing therethrough, and a passageway 126 leading therefrom.

The conduit walls 121 and 122 define an air supply compartment or sump 130 and lead to an electrostatic filter schematically illustrated at 131 and connected to a suitable source of electrical energy, not shown. The compartment is connected to the passageway 126. A damper door 132 is adapted to engage in sealing relationship a lip 133 and is urged into engagement therewith by a spring loaded hinge 134 secured to the wall 121. The hinge 134 is adjusted at a predetermined value so that the door remains in engagement with the lip 133 until a predetermined negative pressure exists within the compartment 130. Accordingly, the damper 132 constitutes an auxiliary air supply means to make up air lost to the ventilating system. An inlet air supply conduit 136 is formed by walls 137 and is disposed in communication with the supply compartment. Air is motivated through the system by a blower 135 mounted downstream from the damper 132 and supplies air under a predetermined pressure to the inlet air supply conduit 136.

A distributing manifold 140 is mounted on the inlet air supply conduit 136 and affords a distributing chamber 141 leading to a discharge aperture 142. In the form of the invention illustrated, the discharge aperture 142 is an elongated throat disposed immediately adjacent to the marginal edge 19 of the zone 17. Accordingly, the discharge aperture at least partially circumscribes the localized zone 17. Air flowing from the discharge aperture is controlled both in volume and direction by a lip 143 and a control plate 144. The plate is preferably adjustably mounted on the supply conduit 136 by means of the bolt 145 and a nut 146 welded to the conduit. Opposite flanges 147 and 148 respectively welded to the conduit 136 and the manifold 140 afford a releasable connection therebetween. Accordingly, air from the blower 135 is directed through the aperture 142 to form a moving air stream 150 having a central core moving in the direction of the arrows 151 toward the approximate center of the exhaust opening 124.

A means to control the temperature of air flowing between the exhaust and the inlet portions of the system is provided by a combination heat-exchange or evaporative and refrigerative cooling means. The evaporative cooling portion includes a water supply pipe 160 leading to a plurality of admission pipes 161 which distribute a metered flow of water into distributing trays 162. The water passes through an evaporating pad 163 while air is directed through the pad by guide vanes 164. A perforate diffusing wall 165 is disposed on the downstream side of the pad 163 and cooperates with a perforate wall 166 to form a cooling chamber 167 therebetween. Both the walls 165 and 166 also serve as baffles to prevent entrainment of droplets of water in the air stream moving through the chamber 167. An expansion coil 168 is disposed within the chamber 167 and in communication with a conventional refrigerating system schematically illustrated at 169 and includes supply and return conduits 170 and 171. An eliminator filter 172 is disposed downstream of the pad 163 to remove water droplets, condensed greases and the like, from the air flowing toward cooling chamber 167.

A water collecting hopper 175 is disposed beneath the pad 163 and includes an elongated drain tube 176 leading to a suitable drain for the water passing through the evaporative cooling pad. A resistance coil 177 is wrapped about a portion of the tube 176 and by means of conductors 178 is connected to a suitable source of electrical energy, not shown. The resistance element 177 is provided to maintain the temperature of the water passing through the tube 176 above the freezing or solidification temperature of any fats removed from the air stream by the water passing through the evaporative pad 163.

OPERATION

The operation of the described embodiment of the subject invention is believed to be readily apparent and is briefly summarized at this point. It is to be assumed that the grill 10 and the ventilation system of the present invention is installed in a substantially closed building, such as a contemporary restaurant. During the cooking of articles of food, such as the steaks on the surface 11, the blower 135 is motivated to provide a positive pressure in the inlet conduit 130. Consequently, a moving stream of air, schematically indicated at 150, is directed toward the exhaust opening 124 of the hood 120. The stream of air 150 is discharged from the elongated aperture 142 as a protective blanket overlying the grill 10 and the localized zone 17 from which the fumes 16 emanate. The stream of air 150 has a central core moving in the direction of the arrows 151 directed toward the approximate central portion of the inlet opening 124.

The stream of moving air 150 serves as a protective blanket overlying the zone 17 and prevents the free passage of the fumes 16 away from the grill 10 and into the ambient air, which normally would occur by convective air movements. Due to the friction between the moving air stream 150 and the convective currents within the zone 17, small eddy currents 56 of the fumes are formed at the upper portion of the zone 17. Due to the intermixing of the air in the zone 17 and in the stream 150, the fumes are picked up by the air stream 150 and are either dropped out as a heavier condensate or are carried toward the exhaust opening 124.

It is to be observed that the inlet conduit 130 provides a supply of air which has been cooled by the cooling portion and directed toward the distributing manifold 140. Consequently, the manifold is maintained at relatively cooler temperatures so that the surface 149 is well below a temperature considered dangerous to personnel in and around the grill 10. In actual practice, the surface 149 is quite cool when measured by the human sense of touch.

The fumes 16 entrained in the air stream 150 are carried to the filter 125, and, in view of the controlled relatively low temperature of the air stream, a major portion of the grease vapors in those fumes are condensed therein and at the filter pad. The minute portions of grease vapors still entrained in the air stream are further condensed as the air stream passes through the evaporative cooling pad 163 and experiences a decrease in temperature, due to the latent heat of vaporization of the water admitted by the pipe 160. Consequently, subsequent condensation in the exhaust hood 120 and air supply compartment 130 is precluded, thus greatly reducing the fire hazard normally attendant previously known ventilation systems for restaurant grills. Further temperature control of the air moving through the exhaust hood passageway 126 toward the inlet supply compartment 130 is afforded by the cooling coil 168 in chamber 167.

The eliminator filter 172, in conjunction with filter 125 and pad 163, insures that air passing through the chamber 167 into the compartment 130 is substantially free from contaminants. This is quite essential since the compartment 130 serves as a common sump for both the exhaust conduit portion and the air supply conduit 136 of the closed-cycle ventilation system described.

The filter 125 in conjunction with the electrostatic filter 131 removes substantially all of solid contaminating particles suspended in the air moving through the ventilation system. Accordingly, the blower 135 can continue operation throughout extended periods, and any makeup air for losses sustained is provided through the damper 132. The hinge 134 is readily adjusted to provide opening of the damper at any desired predetermined negative pressure existing in the supply compartment or sump 130.

Accordingly, the present invention provides a ventilation system which effectively confines fumes emitting from a localized zone and removes the fumes as they emit from the zone. The relationship of the air inlet supply means and the air exhaust means is such that the system is substantially self-sufficient, insofar as air supply is concerned. Consequently, the ambient air within the building in which the system is installed is not used as the exhaust vehicle for fumes generated in the localized zone. Accordingly, air losses, as well as total heat load, is reduced in the building. Other directly related benefits of the system are the material reduction of fire hazard in the exhaust stack passageways of the exhaust hood, as well as maintaining the temperature of structure surrounding a localized heating zone at a level well below that considered dangerous to humans. Consequently, the invention enhances the safety of persons in and around such a heating unit, while effectively removing heat and fumes generating therefrom.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claim so as to embrace any and all equivalent devices and apparatus.

Having described my invention, what I claim as new and desire to secure by Letters Patent is:

A ventilation system adapted to remove heat and fumes generating from a localized zone of predetermined dimensions, the zone having marginal edges and a central portion, the system comprising an exhaust hood affording an exhaust opening; a grease filter supported in the hood and adapted to remove vaporized grease from air passing through said opening; means supporting the hood in a position above said zone to receive air directed therefrom; an air supply compartment disposed adjacently of the zone and providing an air sump, said hood providing an exhaust passageway connected to the compartment and disposed in communication with the air sump; an air filter disposed in said hood and adapted to remove fumes and contaminants carried in air flowing through said passageway; cooling means disposed in said hood in heat exchange relationship with air flowing through said passageway to reduce the temperature of said air; an inlet air supply conduit disposed in communication with said sump to receive air therefrom; means supporting the inlet conduit adjacent said zone; a distributing manifold carried on said inlet conduit and providing an elongated narrow discharge aperture having opposite sides and being adjacent and parallel to one of said marginal edges and at least partially surrounding said zone; a flow directing lip carried on said manifold adjacent to one side of the aperture and extended therealong parallel to and in flow directing relationship to air discharged from the aperture; a volume and direction control plate; means mounting the control plate on the manifold adjacent to the opposite side of the aperture from the lip and adapted to allow adjustment of the plate to direct air discharged therefrom toward said exhaust opening of the hood at selected flow rates; blower means mounted in said inlet conduit to motivate air from said sump toward said manifold and to be discharged from the aperture to form a protective barrier overlying said zone and to serve as a vehicle in removing heat and fumes therefrom; and auxiliary air supply means carried by the supply compartment in pneumatic communication between the ambient air and the sump to make up any air losses of the system.

References Cited by the Examiner

UNITED STATES PATENTS

| | | | |
|---|---|---|---|
| 1,287,027 | 12/1918 | Janson | 98—40 |
| 2,312,272 | 2/1943 | Stacey | 98—40 |
| 3,111,077 | 11/1963 | Cortright | 98—115 |
| 3,125,869 | 3/1964 | Minton | 98—115 |
| 3,131,687 | 5/1964 | Kalla | 98—115 |
| 3,131,688 | 5/1964 | Lipstein | 126—299 |
| 3,134,243 | 5/1964 | Hagen | 98—36 X |

OTHER REFERENCES

German printed application, 1,109,342, June 1961.

ROBERT A. O'LEARY, *Primary Examiner.*

JOHN F. O'CONNOR, WILLIAM F. O'DEA, *Examiners.*